United States Patent [19]

Poland

[11] Patent Number: 4,761,544
[45] Date of Patent: Aug. 2, 1988

[54] MEANS AND METHOD OF SCALING TIME INTERVAL MEASUREMENTS FROM AN OPTICAL BAR CODE SCANNER TO IMPROVE DECODER EFFICIENCY

[75] Inventor: McKee D. Poland, Palo Alto, Calif.

[73] Assignee: Hewlett-Packard Company, Palo Alto, Calif.

[21] Appl. No.: 798,765

[22] Filed: Nov. 15, 1985

[51] Int. Cl.⁴ .............................................. G06K 7/10
[52] U.S. Cl. .................... 235/462; 235/466; 235/470; 235/472
[58] Field of Search ............... 235/436, 466, 470, 472, 235/474, 462

[56] References Cited

U.S. PATENT DOCUMENTS 3,864,548  2/1975  O'Neil et al. ........................ 235/466
4,578,570  3/1986  Mazumder et al. ............ 235/466 X Primary Examiner—David L. Trafton
Attorney, Agent, or Firm—James M. Williams

[57] ABSTRACT

A bar code decoder transforms the output from a wand scanner so that it has the same characteristics as the output from a laser scanner. Once this transformation is accomplished, decoding is done using the same process and hardware to decode wand or laser scanner data. The transformation includes scaling and compensation of the wand data by a digital filter in which the input values are divided by a dynamic scaling factor to produce the output values.

9 Claims, 7 Drawing Sheets

$$c(i) = E(i)/d(i-1) \quad (3)$$

$$d(i) = \begin{cases} d(i-1)+2 & \text{if} \quad 2E(i-2) < E(i-1) \\ d(i-1)+1 & \text{if} \quad E(i-2) < E(i-1) \leq 2E(i-2) \\ d(i-1) & \text{if} \quad E(i-2) = E(i-1) \\ d(i-1)-1 & \text{if} \quad \tfrac{1}{2}E(i-2) \leq E(i-1) < E(i-2) \\ d(i-1)-2 & \text{if} \quad E(i-1) < \tfrac{1}{2}E(i-2) \end{cases} \quad (4)$$

$$(6) \quad c(i) = E(i)/d(i-1)$$

$$(7) \quad a(i) = \begin{cases} \frac{1}{2}b(i-1) + \frac{1}{2}c(i) & \text{if} \quad c(i) \geq 200 \\ \frac{3}{4}b(i-1) + \frac{1}{4}c(i) & \text{if} \quad 160 \leq c(i) < 200 \\ \frac{7}{8}b(i-1) + \frac{1}{8}c(i) & \text{if} \quad c(i) < 160 \end{cases}$$

$$(8) \quad b(i) = \begin{cases} 100 & \text{if} \quad a(i) \geq 110 \\ a(i) & \text{if} \quad 60 < a(i) < 110 \\ 80 & \text{if} \quad a(i) \leq 60 \end{cases}$$

$$(9) \quad d(i) = \begin{cases} \frac{17}{16}d(i-1) & \text{if} \quad a(i) \geq 110 \\ d(i-1) & \text{if} \quad 60 \leq a(i) < 110 \\ \frac{15}{16}d(i-1) & \text{if} \quad a(i) < 60 \end{cases}$$

FIG 9

MEANS AND METHOD OF SCALING TIME INTERVAL MEASUREMENTS FROM AN OPTICAL BAR CODE SCANNER TO IMPROVE DECODER EFFICIENCY

BACKGROUND AND SUMMARY OF THE INVENTION

The invention relates generally to decoders for bar code scanners, and in particular to a decoder capable of processing the output data from either wand scanners or from moving beam laser scanners.

Bar codes are printed patterns that represent information and are machine readable. Bar codes consist of alternating bars and spaces whose varying widths encode sets of characters, such as letters and digits. Because bar codes have proven faster and more accurate than keyboard entry, manufacturers of data collection terminals, point- of-sale terminals, keyboards, weighing scales, and other data collection and material handling equipment are finding a growing demand for bar code reading capability in their products. Bar code labelling is used for product identification and tracking in industries such as medical labs, food processing and sales, and automobile manufacturing.

In a bar code label, each individual character is represented by an ordered group of individual bars and spaces. The bars and spaces, referred to as elements, come in a range of discrete widths, and the width of each element must be a multiple of a standard dimension called a module. In most bar codes, elements are from one to three modules wide. A module has a specified set of absolute widths and tolerances for each bar code symbology. The character set representable by the bar code and the number of elements per character vary from one symbology to another. For example, the character "0" in the Universal Product Code symbology can be represented by the sequence: bar 3 modules wide, space 2 modules wide, bar 1 module wide, space 1 module wide.

Bar codes are read in a two step process: scanning and decoding. The scanning step serves to create an electrical signal that represents the widths of the bars and spaces of the bar code being scanned. In the decoding step, the signal provided by the scanner is measured and interpreted to form the characters encoded in the bar code.

Scanning devices fall into two major categories: those that require the operator to provide scanning motion, and those that do not. The most common type from the first category is the hand held bar code scanning wand, and the most common from the second category is the hand held moving beam laser scanner. Both types of scanning devices use a light source directed from within the scanner to illuminate an area on the target bar code tag. A photodetector is imaged onto the illuminated area, and senses light along the path of the scanning motion, which may be manual in the case of a wand or by means of automatically moving parts in the case of a moving beam scanner. As the photodetector reacts to the presence or absence of reflected light from the bars and spaces, the scanner produces an analog or digital output signal which is at one level when sensing a bar and at another level when sensing a space. While scanning a bar code, the relative durations of the alternating output states are measured as time intervals by the decoder, and correspond to the relative widths of the printed elements.

The absolute values of the time intervals are related inversely to the velocity of the scanning motion. The faster the scanning motion, the smaller the time intervals. Also, the less variation in velocity (acceleration), the less variation in the average size of the time intervals. Thus, when comparing the time intervals from a wand, which is moved by hand, to a laser scanner, which employs rotating mirrors to rapidly move the laser beam, two main differences are apparent:

(1) the range of useful values of the time intervals for the wand is approximately 300 microseconds to 100 milliseconds, whereas for the laser scanner, the range is approximately 10 microseconds to 400 microseconds; and (2) the acceleration experienced by the scanner and the corresponding change in the time interval values is much greater for the wand than for the laser.

The decoder consists of both hardware and software for processing the scanner signal and producing decoded data. FIG. 1 shows schematically a typical decoder configuration. Decoder 11 includes one or more timers 12 to measure the time intervals of pulses from the scanner output, a microprocessor 18, read-only memory 20 which contains decoding software, random-access memory 22 for variable arrays and buffers, and I/0 circuitry 24. The software performs time interval data acquisition and storage, transformation from time interval values to decoded characters, as well as various I/0 functions depending on the application.

In the past, decoders for hand held laser scanners and hand held wand scanners have been separate devices, or at least have used separate hardware components for reading bar codes with the two scanner types. The decoding software has been specific to the type of scanner being used. It would be advantageous to have a single decoder—one set of hardware components and one decoding program—that can function with either a wand or a laser scanner. The designer of a system which uses bar codes need not duplicate his efforts to incorporate both wand and laser scanning, if the decoder allows the facile interchange of scanners.

One system is currently in use which can take input from either scanner type, but requires replication of some hardware and software, and still does not operate as efficiently as a single decoder. This system, as illustrated in FIG. 2, consists of a wand decoder 26 and an adaptor 28 for the laser scanner. The adaptor 28 includes the timers, microprocessor, ROM, and RAM needed to decode the laser output signals. The adaptor itself decodes the laser output and then creates a simulated wand output signal as though a wand had been used for scanning. The new signal is fed to the wand decoder 26, which re-decodes it and performs the input/output functions of the application. The disadvantages of this approach are that most of the decoding hardware and software is duplicated, and decoding efficiency is reduced because two decodings must be performed sequentially for each bar code read.

In accordance with the present invention, a better solution for decoding the output of both wand and laser scanners can be implemented through efficient software installed in a single decoder to perform both wand and laser decoding functions without extra hardware. The combination of decoding functions is done by transforming the output data from the wand scanner so that it has the same characteristics as the output of the laser scanner. Once the transformation is accomplished, the decoding process and the hardware needed are the same for either type of scanner input, so one decoder system suffices.

In order to combine decoding software for both wand and laser scanners without increasing the amount of decoder hardware, it is necessary to minimize program memory space, data memory space, and decoding execution time. This is achieved in the embodiment of the invention, which is a method of scaling and compensating wand time intervals as they are acquired by the decoding hardware so that the resulting range of time interval values is equivalent to the range for a laser, and the apparent acceleration effects on the time interval data are greatly reduced or eliminated. Then wand data may be decoded with the routines that are used to decode laser data. Since wand data decoding routines are no longer necessary, program memory space is saved. Since the range of values of the time intervals is limited, fewer bits are needed to represent them, so data memory space is saved. Finally, execution time for decoding is saved because decoding routines that handle numbers represented by fewer bits run more quickly, and acceleration compensation routines need not be distributed among the decoding algorithms for separate bar code types. The savings in memory space and execution time are advantageous even in a wand decoder system that does not include the capability of handling laser scanner output, because more features and decoding functions can be added to the system without adding more hardware.

The scaling and compensation is performed as the wand time intevals are acquired, so that only scaled and compensated data is stored for decoding. An interrupt driven time interval acquisition routine stores wand data in its unscaled, uncompensated form in a circular queue, and another routine performs the scaling and compensation, emptying the queue continuously. The scaling and compensation consists of dividing each raw time interval by a dynamic scaling factor and keeping the quotient, which becomes the new time interval measurement used by the decoding routines. The scaling factor is the output of a digital filter whose input is the current quotient, a window of previous raw time intervals, and a window of previous scaled, compensated time intervals. The function of the digital filter is to update the scaling factor so that the next quotient will remain in the desired range; this also has the effect of removing the apparent acceleration.

BRIEF DESCRIPTION OF THE DRAWINGS

FIG. 9 shows the equations that describe the operation of the preferred embodiment of the digital filter of the invention.

DETAILED DESCRIPTION OF THE INVENTION

Figure 1:
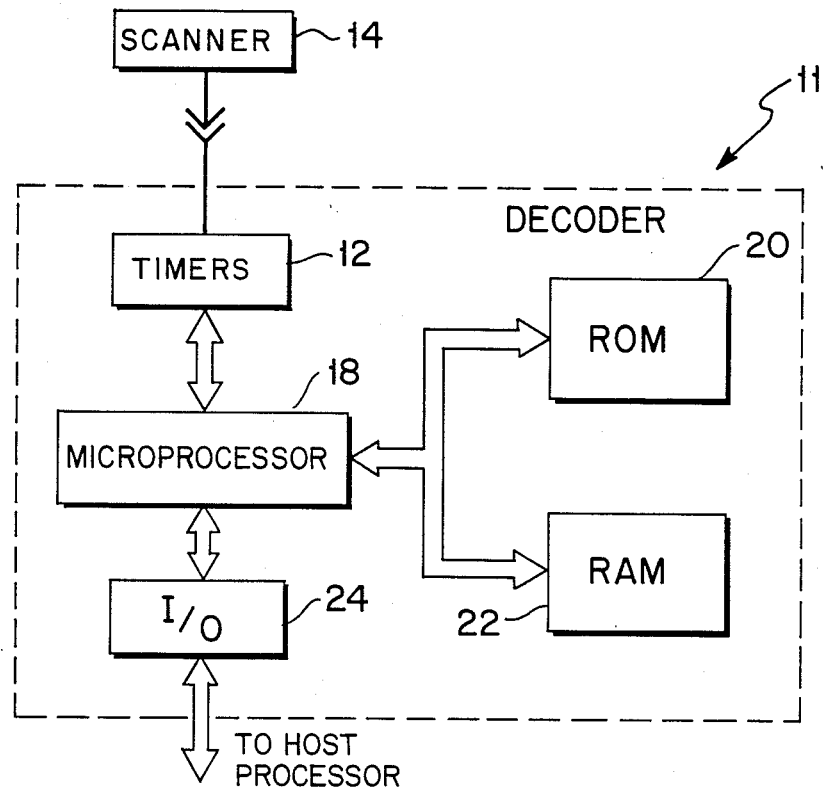
FIG. 1 is a schematic block diagram of a typical bar code decoder.
Figure 2:
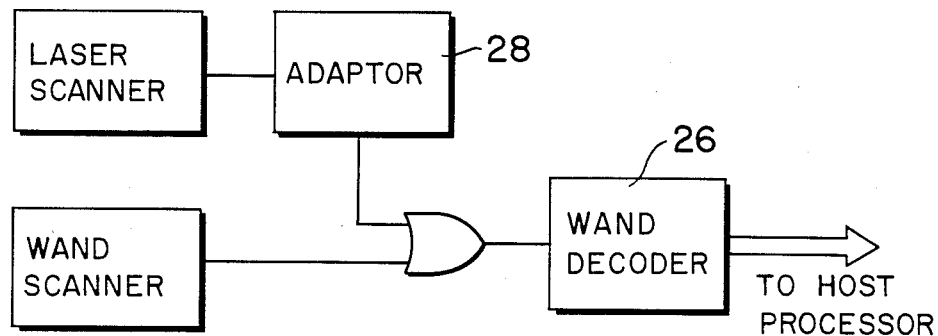
FIG. 2 is a schematic block diagram of a known bar code decoder for use with either wand or laser scanners.
Figure 3:
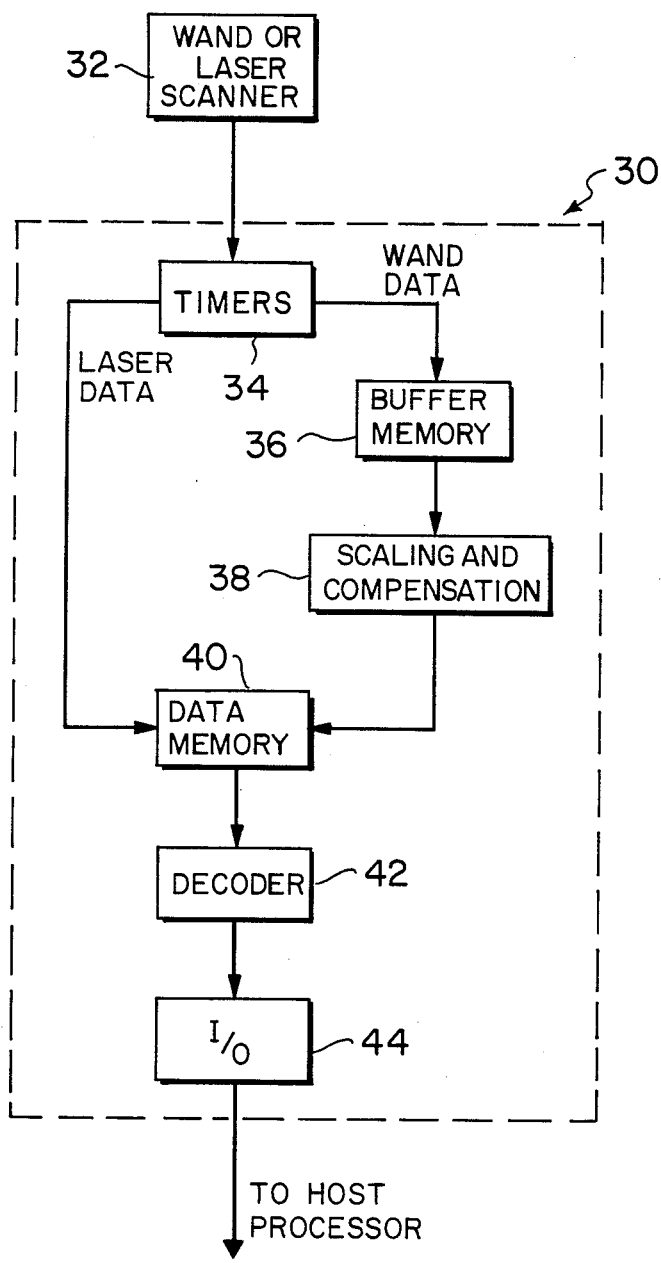
FIG. 3 is a schematic block diagram of the data flow in a bar code decoder constructed in accordance with the invention.

The data flow in the decoder system of the invention is shown in FIG. 3. The digital data output from a wand or a laser scanner 32 is connected to timers 34 which measure the time intervals and produce a stream of integer data. Laser time interval data is sent directly to memory 40 where it is held for decoding. Time intervals taken from the wand, on the other hand, are loaded directly into a small circular queue in buffer memory 36. A digital scaling and compensating filter 38 empties the queue continuously, taking the raw wand data and performing the scaling and compensation required to convert it into data with the characteristics of data from the laser scanner, then storing it in memory 40. The scaling and compensation is performed as the wand time intervals are acquired, so that unscaled and uncompensated data is stored only in the circular queue and only scaled and compensated data is stored in memory 40 for decoding.

Since the wand data, preprocessed at filter 38 and loaded into memory 40, has the same characteristics as the laser data, the same decoding routines are used whether the input data originated from a laser scanner or from a wand scanner. The data is decoded at block 42 and input/output processing is done at block 44, where the decoded bar code information can be transferred to a host processor.

In scaling the time intervals, filter 38 needs to convert binary input values in a 16 bit range into binary output values in an 8 bit range. The filter 38 must also compensate for large variations in the average of the input data values, caused by acceleration of the wand. While the input time interval values may vary widely within their 16 bit range according to variations in the scanning velocity, the output of the filter 38 must remain in the range from 0 to 255, but must also preserve the relative proportions of the input time interval values.

Figure 4:
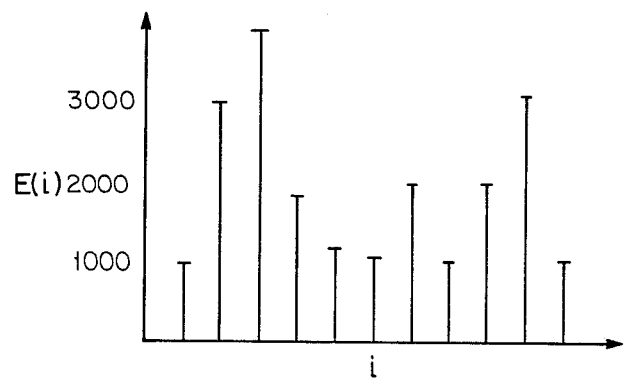
FIG. 4 is a graph depicting a series of time interval values.
Figure 5:
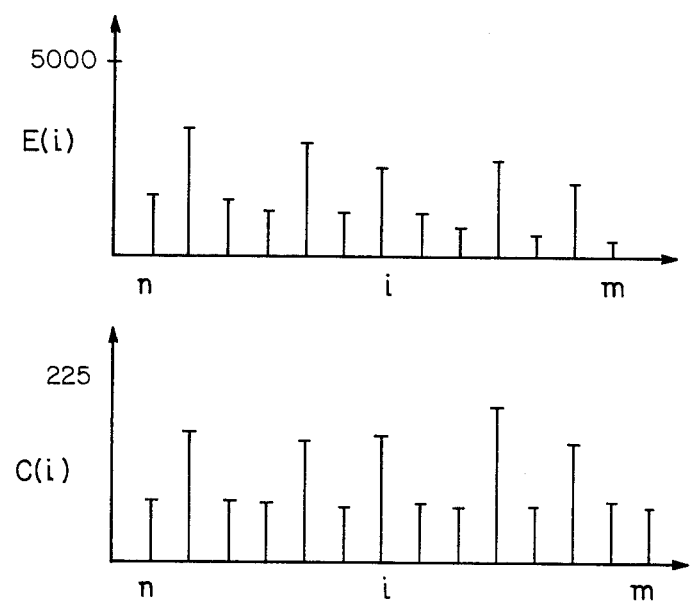
FIG. 5 illustrates the result of scaling and compensation on a series of time interval values.

The stream of time intervals E(i) can be conveniently displayed graphically, with the value of E(i) displayed on the vertical axis and the index i on the horizontal axis. Such a display is illustrated in FIG. 4. Using this representation, an example of scaling and compensation is depicted in FIG. 5. Here scaling and compensation results in a stream of output data c(i). The time intervals E(i) have been scaled down to bring them within the range 0 to 255. The effect of acceleration, as indicated by the decreasing envelope of E(i), is removed. However, the relative proportions of the c(i) are locally the same as in the corresponding E(i) values.

Figures 6, 7:
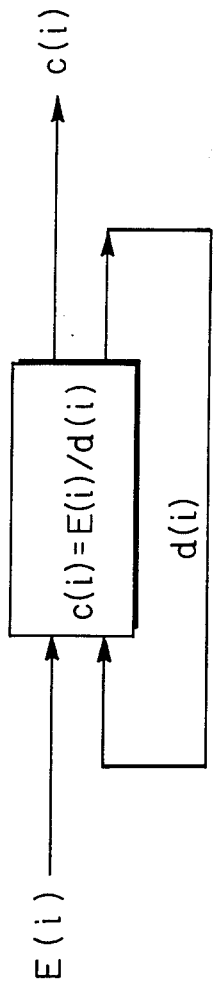
FIG. 6 shows the general form of the digital filter of the invention.
FIG. 7 shows the equations which describe the operation of one embodiment of the digital filter of the invention.

A general form for the digital scaling and compensating filter 38 is shown in FIG. 6. The filter scales and compensates the E(i) input values by dividing them by a dynamic scaling factor d(i) to produce the corresponding output values c(i). In the general form, d(i) is determined according to the function:

$$d(i) = f(E(0), \ldots E(i-2), E(i-1), E(i), E(i+1), \ldots), \qquad (1)$$

-continued $$c(0), \ldots c(i-2), c(i-1), c(i), d(0), \ldots d(i-2), d(i-1))$$

The filter is recursive, since d(i) terms are fed back to the input of the filter. The filter is also noncausal since E(i) terms with positive offsets (future samples) are present in the function f. The filter is nevertheless realizable since E(i) may be buffered in queue memory 36 before entering the filter.

FIG. 7 shows the equations which describe the operation of one embodiment of a simple version of the digital scaling and compensation filter 38. In this implementation, the filter is causal and recursive, with d(i) determined according to the general function:

$$d(i)=f(d(i-1),E(i-2),E(i-1)) \qquad (2)$$

Two equations govern the operation of the filter. The first, equation 3, shows the division of the raw time intervals E(i) by the divisor d(i-1) to produce scaled time intervals c(i), as referred to previously. The second, equation 4, determines the next value for the divisor d(i).

Referring to FIG. 7, in equation 3, an input value E(i) is divided by the scaling factor from the previous iteration, d(i-1), to produce the output c(i), a scaled time interval. The next divisor d(i) is calculated in equation 4.

The next value d(i) is merely the previous value d(i-1), incremented or decremented once or twice depending on the value of the two previous E(i) input values. If the E(i) values are increasing quickly, with the penultimate more than twice the value of the antepenultimate, then d(i-1) is incremented twice to compensate quickly. If the E(i) values are increasing moderately fast, then d(i-1) is incremented only once. Similar actions apply to decreases in the E(i) values resulting in decrementing d(i-1). If the E(i) values remain constant, d(i) is kept constant. Since the divisor d(i) increases as the numerator E(i) increases and decreases as E(i) decreases, the resulting output value c(i) tends to stay near the same value, varying smoothly to compensate for changes in the value of E(i) which reflect variations in scanning velocity. Since d(i) cannot abruptly follow single, momentary changes in E(i), however, the relative sizes of the time periods, and thus the widths of the bars and the spaces, is preserved.

Figure 8:
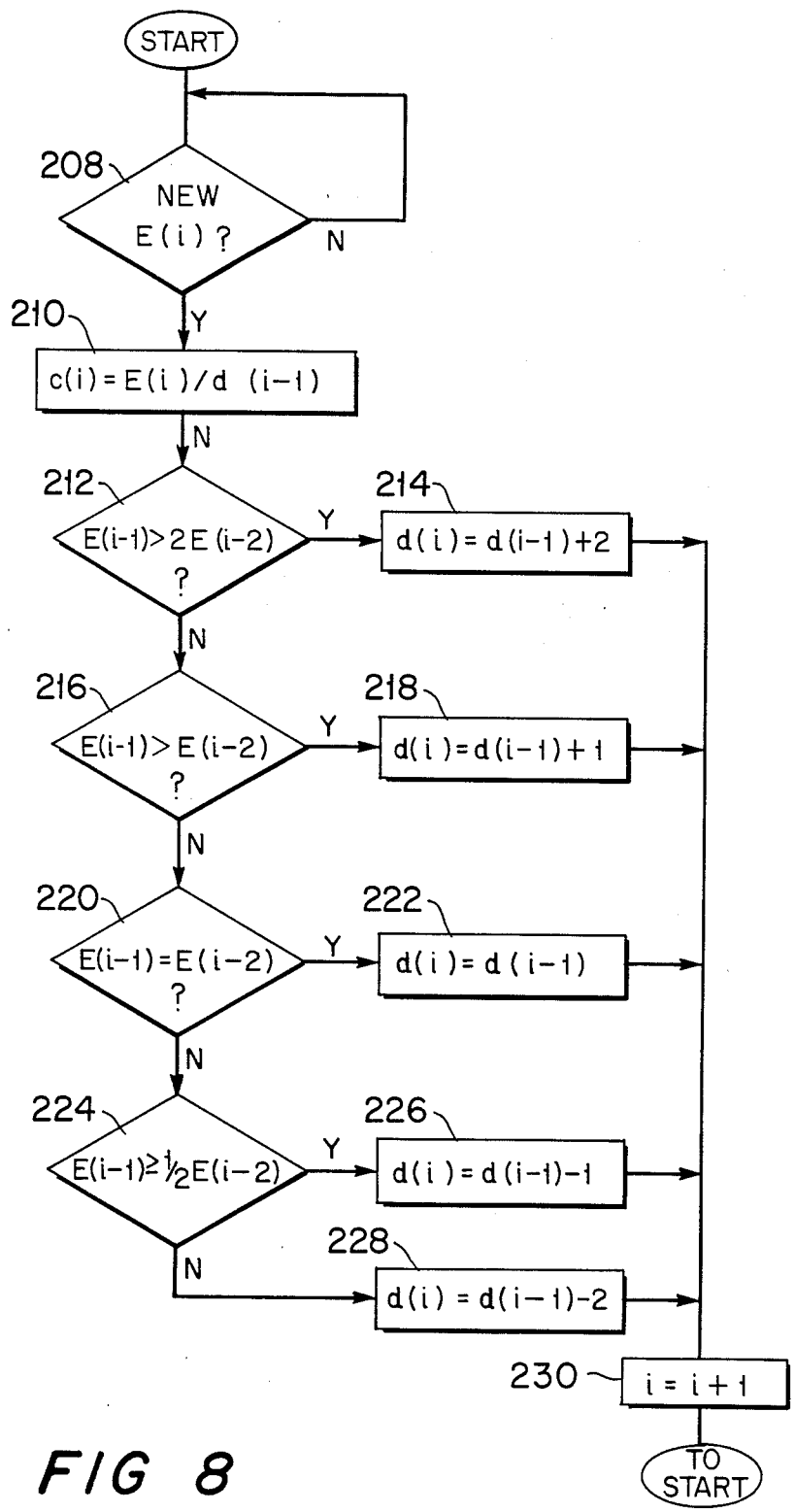
FIG. 8 is a flow chart for the digital filter of the embodiment described in FIG. 7.

FIG. 8 shows the operation of the simple filter in a flow chart. In operation, the filter of FIG. 8 starts at step 208. Upon receiving a new input value E(i), control passes to step 210, where the corresponding c(i) value is calculated by dividing E(i) by d(i).

Control then passes to test 212 to determine if E(i-1) is greater than 2E(i-2). If the result of this test is true, then flow passes to step 214 where d(i) is set equal to d(i-1)+2. If the result is false, flow passes to test 216.

Test 216 determines if E(i-1) is greater than E(i-2). If the result of this test is true, then flow passes to step 218 where d(i) is set equal to d(i-1)+1. If the result is false, flow passes to test 220. Test 220 determines if E(i-1) is equal to E(i-2). If the result of this test is true, then flow passes to step 222 where d(i) is set equal to d(i-1). If the result is false, flow passes to test 224.

Test 224 determines if E(i-1) is greater than or equal to (½)E(i-2). If the result of this test is true, then flow passes to step 226 where d(i) is set equal to d(i-1)−1. If the result is false, flow passes to step 228 where d(i) is set equal to d(i-1)−2.

At steps 214, 218, 222, 226 or 228 the value of d(i) is stored, then flow passes to step 230 where the index variable i is incremented for the next iteration. From step 230 control passes back to the start of the filter routine program at 20B to wait for the next input value.

FIG. 9 shows the equations which describe the operation of the preferred embodiment of the digital scaling and compensation filter 38. In this implementation, the filter is causal and recursive, with d(i) determined according to the general function:

$$d(i)=f(d(i-1),c(0), \ldots, c(i-3),c(i-2),c(i-1),c(i)) \qquad (5)$$

The basic function of this filter is the same as in the simple filter described above: the d(i) values vary proportionally to the E(i) values so as to keep their quotients, c(i) near a central value within a range. In addition, this implementation includes better decisions by the filter on when and how much to change d(i) in order to prevent distortion of the c(i) values.

Four equations govern the operation of the filter. The first, equation 6, shows the division of the raw time intervals E(i) by the divisor d(i-1) to produce scaled time intervals c(i). The other three equations, 7, 8 and 9 describe intermediate calculations used to determine the next value for the divisor d(i), in terms of two intermediate values a(i) and b(i). The operation of the filter can be understood by referring to FIG. 9 and analyzing the meaning of each equation, in order.

The dynamic scaling factors d(i) are the divisors of the raw time intervals, E(i), that produce scaled time intervals c(i). In equation 6, the divisor d(i-1) from the previous iteration is used to form the current result c(i) from the current input E(i). The current divisor d(i) is calculated in equation 9.

Intermediate value a(i), determined from equation 7, is an estimate of the average value of recent c(i). Its expression uses another intermediate value b(i-1), which is merely a clipped version of a(i-1), as explained below by equation 8. Except for the clipping provided by the b(i) terms, the a(i) formula is a recursive smoothing filter for c(i), with a variable frequency response dependent upon the weighting of c(i) with respect to b(i-1). The reasons for the different weightings and the clipping are shown later.

Intermediate value b(i), determined from equation 8, can never exceed 110 or fall below 60. The value of b(i) is set to the value of a(i), unless a(i) is outside the interval 60 to 110, in which case b(i) is clipped to 80 or 100.

In equation 9, the current value of d(i) is determined. Each d(i) value either increases from its previous value to scale c(i) down, stays the same as its previous value, or decreases to scale c(i) up. The choice depends not on c(i) itself, but on the value of a(i), which is an estimate of the average value of recent c(i), as explained in equation 7. If a(i) >= 110, then d(i) is increased; if a(i) < 60, then d(i) is decreased.

Once the four equations have been surveyed, further detail clarifies the choice of functions in equations 7, 8, and 9. In equation 7, a(i) is formed by weighting c(i) more heavily with respect to b(i-1) if c(i) is large, and less heavily if c(i) is in the medium or low part of the representable range 0 to 255. The variable weighting allows large and sudden increases in E(i), and thereby c(i), to have a more immediate effect on a(i). Since a(i) determines changes in d(i) as seen in equation 9, the filter is more responsive in compensating for increases in E(i) than in compensating for decreases. This is advantageous because the desired quiescent range of the c(i) output, roughly 60 to 110, is logarithmically near the top of the representable range 0 to 255. For example, a doubling of E(i) without an immediate response of doubling d(i) would cause c(i) to double out of the range 0 to 255, whereas a halving of E(i) without immediate compensation would produce c(i) in the range 30 to 55, which is still representable. The quiescent range for c(i) was chosen large so that the c(i) would represent E(i) with more resolution.

In equation 8, the extra clipping of b(i) prevents multiple successive changes in d(i) by tending to keep a(i) values away from the 60 and 110 thresholds for changing d(i). (See equation 9.) If the stream of a(i) values, which change sluggishly due to averaging, were not clipped in forming b(i) values, then b(i) values would linger below or above the 60 and 110 thresholds, causing repeated changes in d(i) before the resulting c(i) drove the values of a(i) back into the interval 60 to 110. That would result in over-compensation in scaling the E(i) stream and distortion of the local ratios of c(i).

In equation 9, the increase or decrease of d(i) must be proportional to the value of d(i); otherwise the amount of change of scaling will be disproportionately large for incremental changes of d(i) when d(i) is small. Therefore, multiplication by a factor, 17/16 for increase, 15/16 for decrease, is performed rather than using a fixed increment or decrement value. These factors are efficiently implemented by doing a swap nibbles instruction for the divide by 16, and an 8 by 8 multiply instruction for the numerator.

Figure 10:
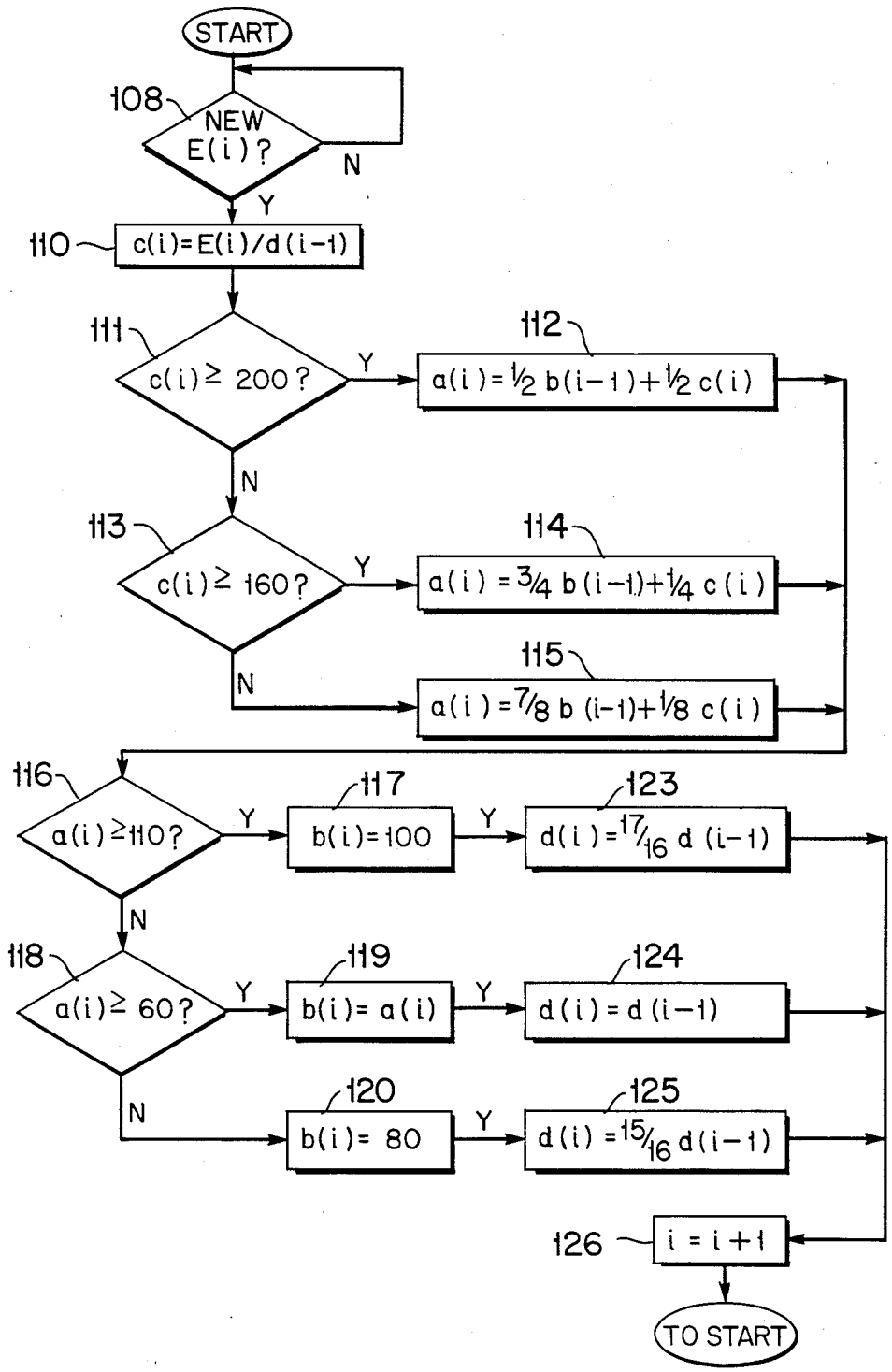
FIG. 10 is a flow chart for the preferred embodiment of the digital filter of the invention.

FIG. 10 describes the operation of filter 38 by means of a flow chart. When the filter receives the current E(i) value at step 108, control passes to step 110 and a corresponding c(i) value is calculated by dividing by divisor d(i-1), from the preceding iteration. The output value c(i) is stored in memory and also used in the next step to determine a(i)

In steps 111 to 115, the intermediate variable a(i) is calculated based on the value of c(i) and b(i-1). At test 111, if c(i) is greater than or equal to 200, flow passes to step 112 where a(i) is set to $(\frac{1}{2})[b(i-1)]+(\frac{1}{2})[c(i)]$. If the result is false, then flow passes to test 113 to determine if c(i) is greater than or equal to 160. If the result of that test is true, then flow passes to step 114 where a(i) is set equal to $(\frac{3}{4})[b(i-1)]+(\frac{1}{4})[c(i)]$. If test 113 is false, then a(i) is less than 160 and flow passes to step 115 where a(i) is set equal to $(\frac{7}{8})[b(i-1)]+(\frac{1}{8})[c(i)]$.

At steps 112, 114 or 115 the a(i) is stored, then flow passes to test 116. In steps 116 to 125, the second intermediate variable b(i) and the new divisor d(i) are determined based on the value of a(i). At test 116, a(i) is tested to determine if it is greater or equal to than 110. If the result is true, then flow passes to step 117 where B(i) is set to 100, and to step 122 where d(i) is set equal to (17/16)d(i-1). If the result is false, flow passes to test 118 to determine if a(i) is greater than or equal to 60. If the result is true, flow passes to step 119, where B(i) is set to a(i), and to step 124 where d(i) is set to d(i-1). If the result of test 118 is false, then a(i) is less than 60 and flow passes to step 120 where b(i) is set to 80 and to step 125 where d(i) is set equal to (15/16)d(i-1).

At steps 122, 124 or 125 the d(i) value is stored, then flow passes to step 126 where the index i is incremented, and flow is transferred back to the start of the routine at step 108 to wait for the next input value.

I claim:

1. A decoder for translating the signals from a bar code scanner into character data, capable of processing the output signals from both wand and laser bar code scanners from scans of various bar code symbology tags without using separate decoding hardware, comprising:

timer means for measuring the pulse width time intervals between the state changes of the signals from the wand and laser bar code scanners and producing a time interval data signal;

filter means comprising an adaptive digital filter connected to the timer means for transforming the time interval data from a wand scanner into time interval data having the characteristics of time interval data from a laser scanner, to produce transformed wand time interval data that preserves the relative proportions of time interval values of bars and spaces of the bar code; and decoder means for receiving the laser time interval data from the timer means and for receiving the transformed wand time interval data from the filter means, for translating the time interval data into character data, said decoder capable of translating only time interval data having the characteristics of data from a laser scanner.

2. The device of claim 1 wherein the filter means is a digital filter capable of scaling the wand scanner signals from a binary range of 16 digits to a range of 8 binary digits, and capable of compensating the wand scanner signals to reduce the apparent acceleration effects from the wand scanner.

3. The device of claim 2 wherein the digital filter scales and compensates the wand scanner signal by dividing each time interval input by a dynamic conversion factor determined as a function of previous input time intervals and previous scaled and compensated time intervals.

4. The device of claim 3 wherein the digital filter is causal and recursive.

5. The device of claim 3 wherein the digital filter is noncausal and recursive.

6. A method of decoding signals from a wand bar code scanner or from a laser bar code scanner to output signals representing characters, capable of processing the output signals from both wand and laser bar code scanners from scans of various bar code symbology tags without using separate decoding hardware, comprising the steps of:

measuring the pulse widths of the input signals to produce a series of time interval data representing the relative widths of the bars and spaces of the bar code;

if the input signal is from a wand scanner, transforming the time interval data into a form having the characteristics of laser scanner data to produce transformed wand time interval data that preserves the relative proportions of time interval values of bars and spaces of the bar code; and decoding the time interval data from the laser scanner or the transformed time interval data from the wand scanner using a decoding scheme capable of decoding only time interval data having the characteristics of laser scanner data.

7. The method of claim 6 further comprising, before the decoding step:

storing the time interval data from the laser scanner or the transformed time interval data from the wand scanner in data memory.

8. The method of claim 6 wherein transforming the wand scanner time interval data comprises dividing each time interval input by a dynamic conversion factor determined as a function of previous input time intervals and previous scaled and compensated time intervals, to scale the wand scanner time interval data from a range of 16 binary digits to a range of 8 binary digits and to compensate the wand scanner time interval data to reduce the apparent acceleration effects from the wand scanner.

9. The method of claim 8, further comprising, before the transforming step:
storing the wand scanner time interval data in a circular queue buffer memory.

* * * * *